No. 733,256. PATENTED JULY 7, 1903.
W. E. NAGEBORN.
GAS ENGINE.
APPLICATION FILED JUNE 20, 1901.
NO MODEL. 5 SHEETS—SHEET 1.

WITNESSES
INVENTOR
William E. Nageborn
By Parker & Burton.
Attorneys.

No. 733,256. PATENTED JULY 7, 1903.
W. E. NAGEBORN.
GAS ENGINE.
APPLICATION FILED JUNE 20, 1901.
NO MODEL. 5 SHEETS—SHEET 4.

WITNESSES
INVENTOR
William E. Nageborn
By Parker & Burton
Attorneys.

No. 733,256. PATENTED JULY 7, 1903.
W. E. NAGEBORN.
GAS ENGINE.
APPLICATION FILED JUNE 20, 1901.
NO MODEL. 5 SHEETS—SHEET 5.

WITNESSES
T. J. Massey
May E. Kott

INVENTOR
William E. Nageborn
By Parker & Burton
Attorneys.

No. 733,256. Patented July 7, 1903.

UNITED STATES PATENT OFFICE.

WILLIAM E. NAGEBORN, OF DETROIT, MICHIGAN.

GAS-ENGINE.

SPECIFICATION forming part of Letters Patent No. 733,256, dated July 7, 1903.

Application filed June 20, 1901. Serial No. 65,376. (No model.)

*To all whom it may concern:*

Be it known that I, WILLIAM E. NAGEBORN, a citizen of the United States, residing at Detroit, county of Wayne, State of Michigan, have invented a certain new and useful Improvement in Gas-Engines; and I declare the following to be a full, clear, and exact description of the invention, such as will enable others skilled in the art to which it pertains to make and use the same, reference being had to the accompanying drawings, which form a part of this specification.

My invention relates to gas-engines; and it consists in the improvements hereinafter described, and pointed out in the claims.

Figure 1:
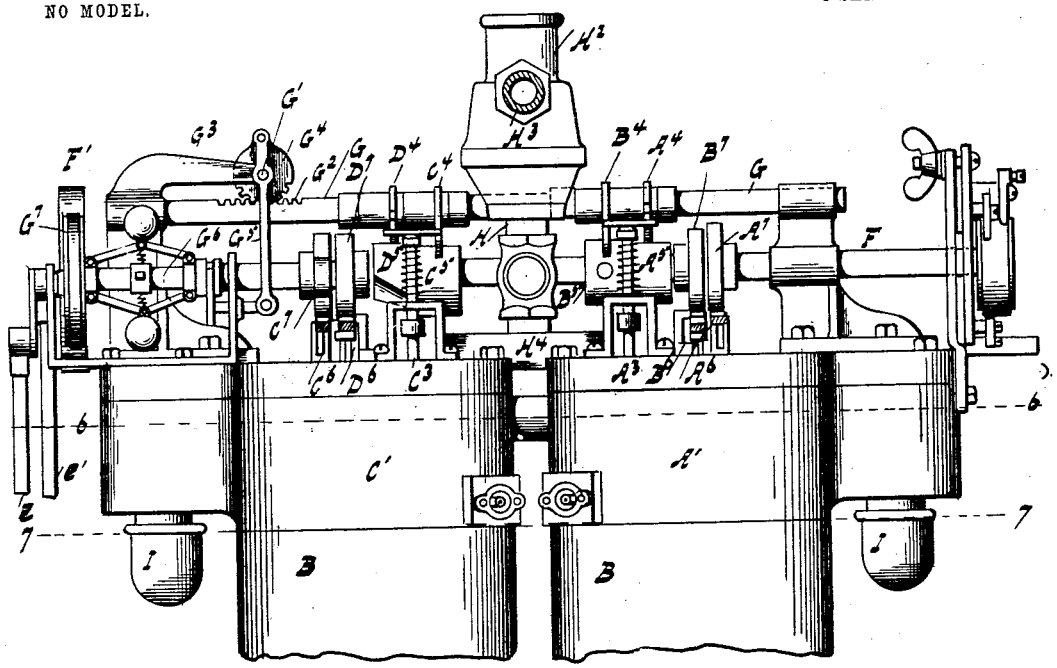
Figure 2:
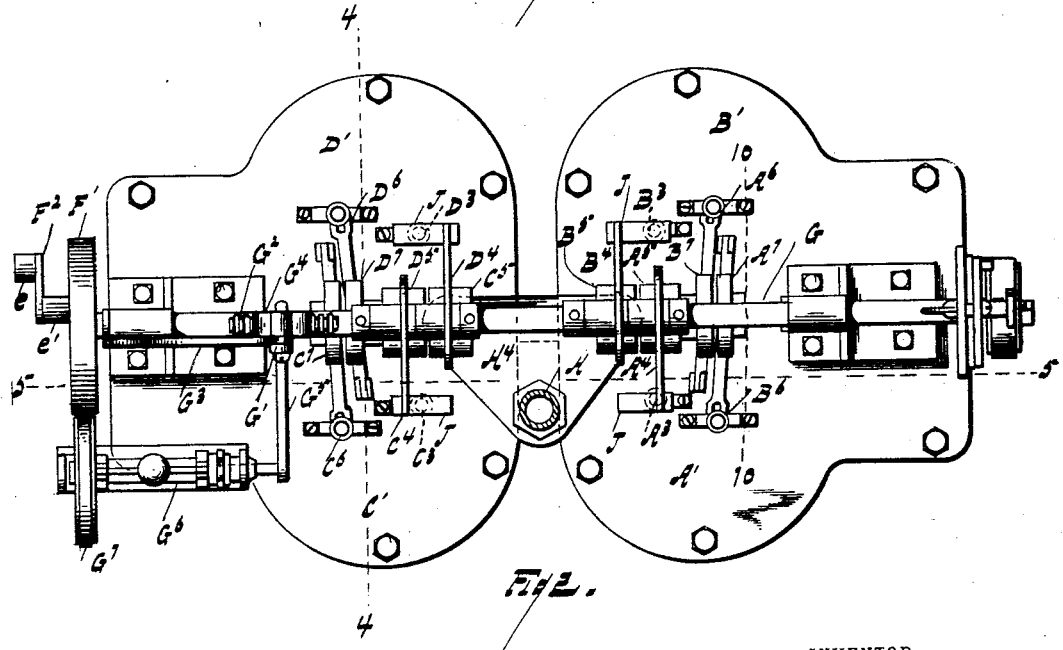
Figure 3:
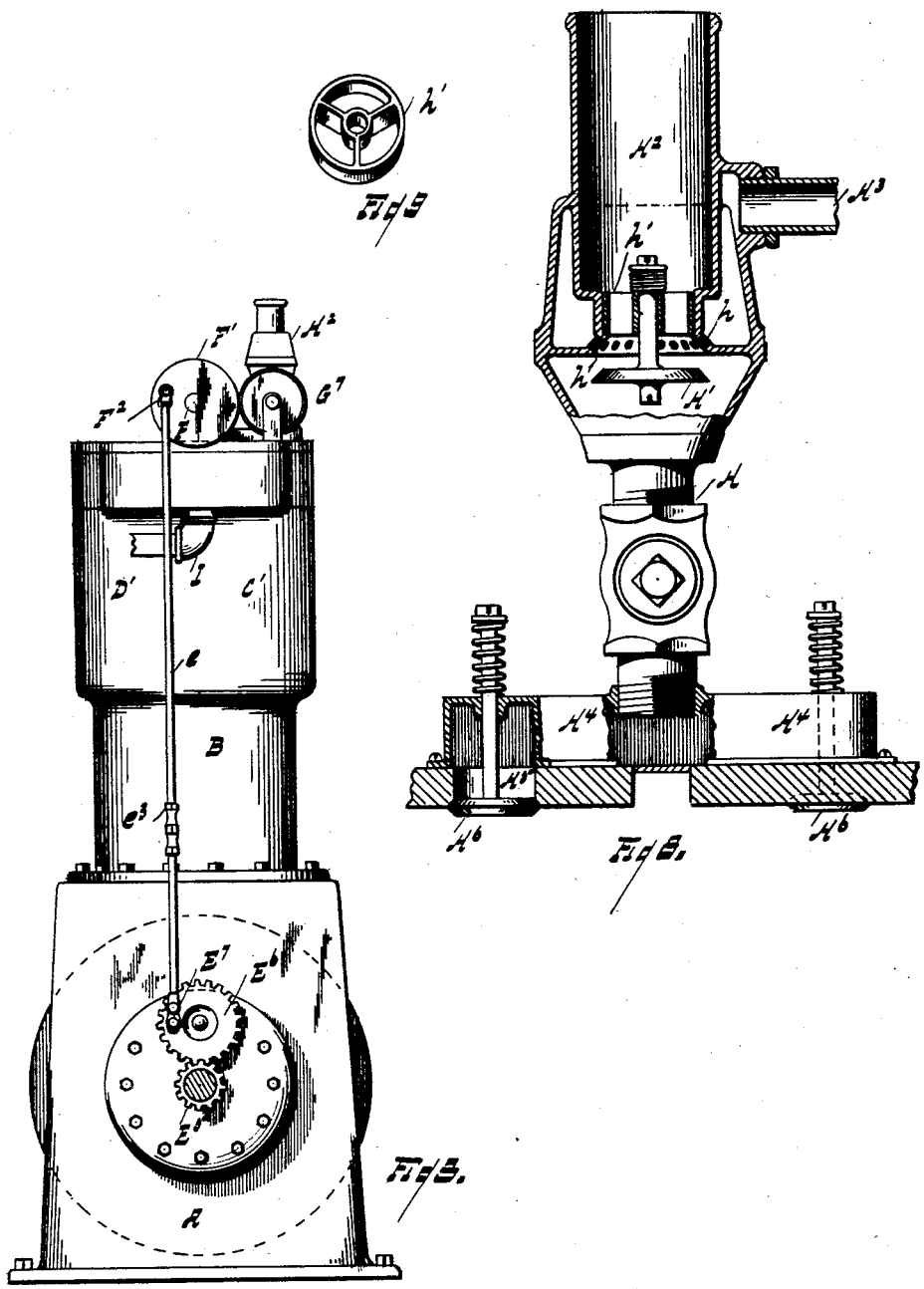
Figure 4:
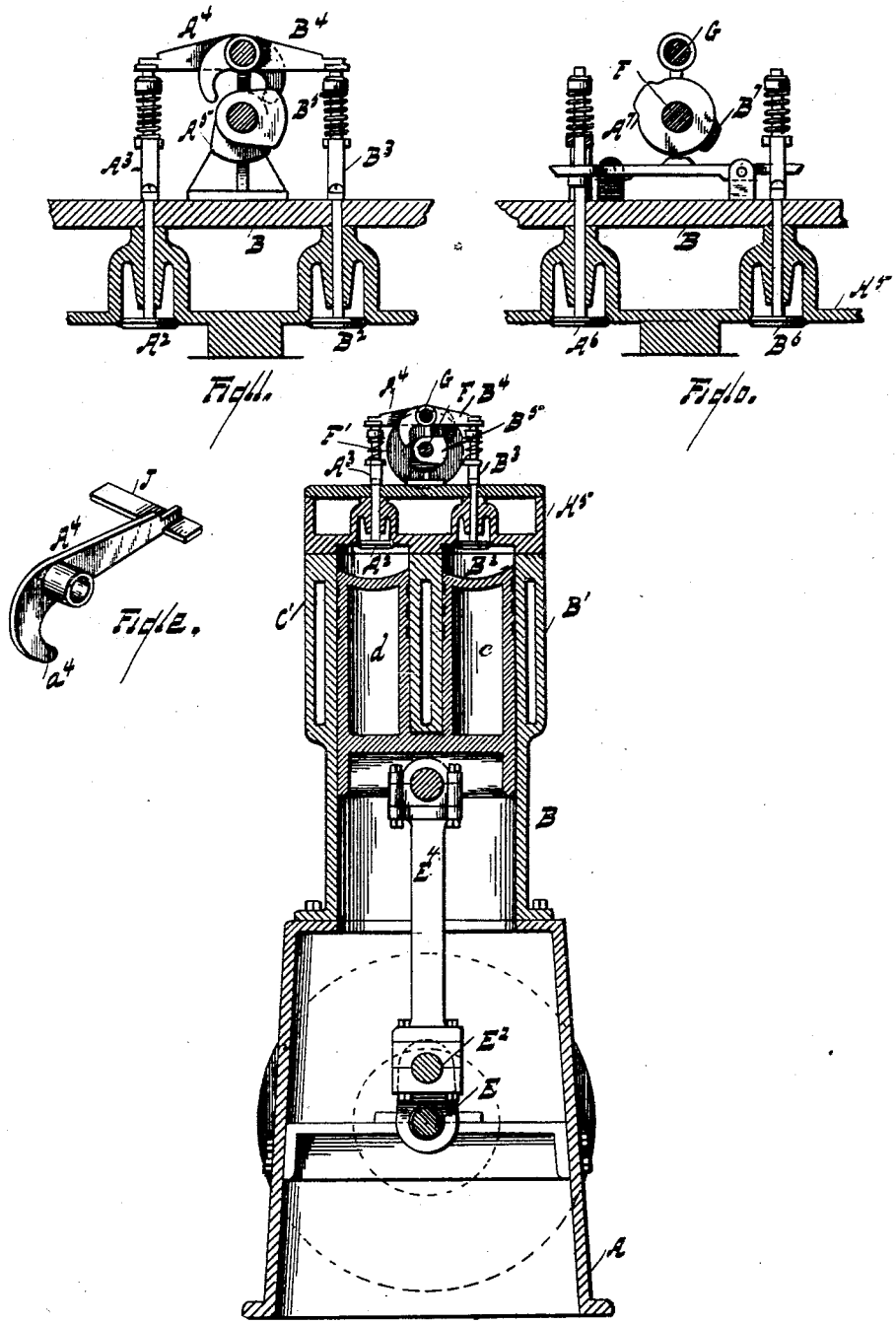
Figure 5:
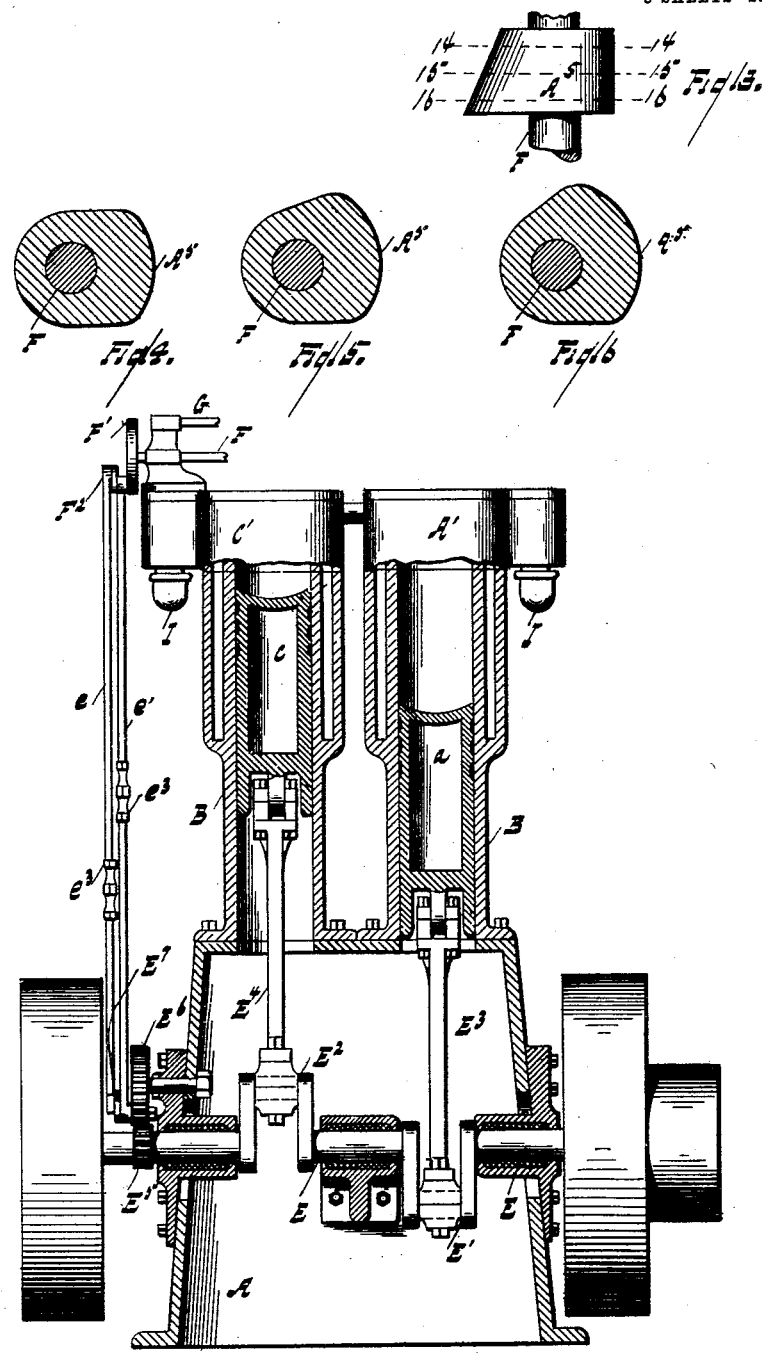
Figure 6:
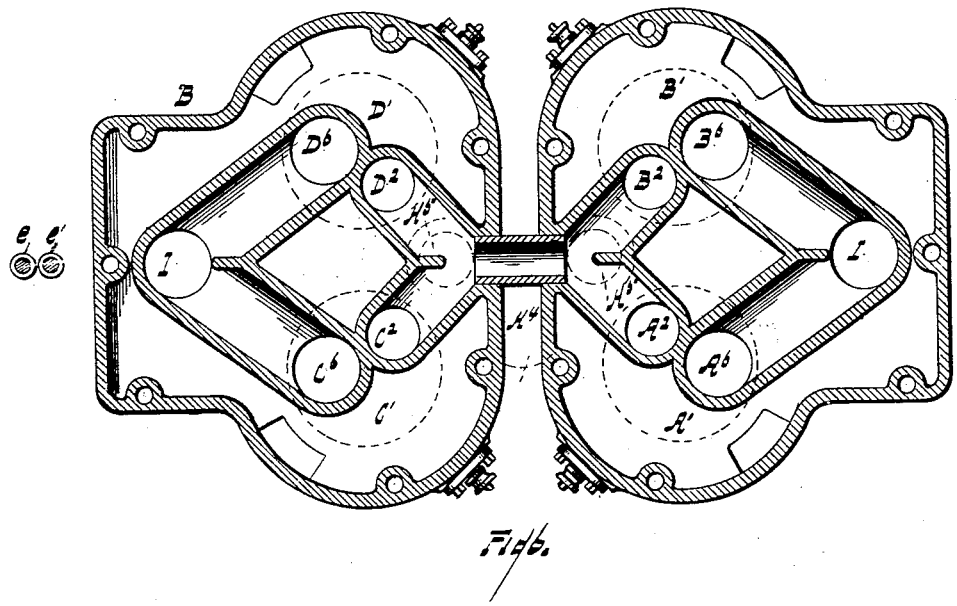
Figure 7:
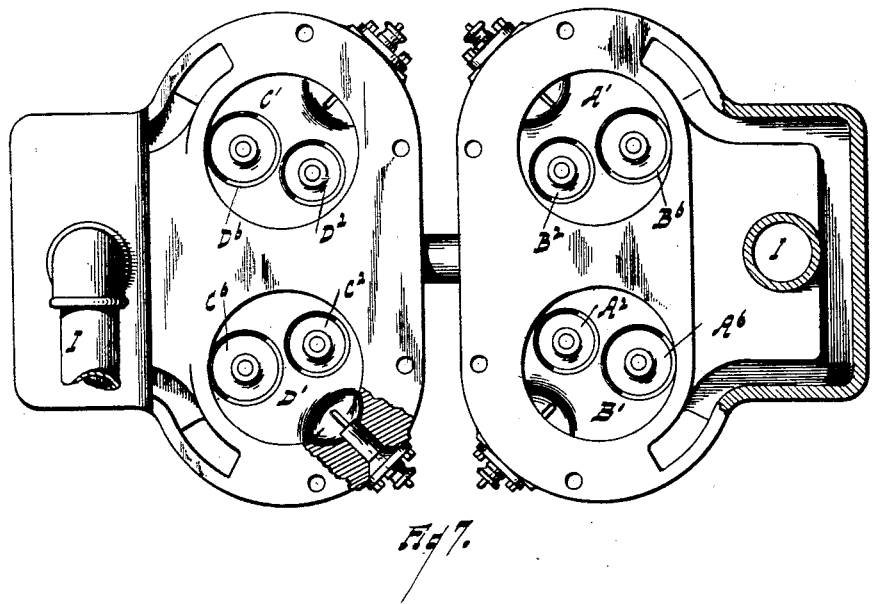

Referring to the accompanying drawings, Figure 1 is a front elevation of the upper part of a gas-engine embodying my invention. Fig. 2 is a plan view of the same. Fig. 3 is a side elevation, a part of the apparatus located upon the upper end of the cylinders being omitted. Fig. 4 is a section indicated by the line 4 4, Fig. 2. Fig. 5 is a cross-section indicated by the line 5 5, Fig. 2, the apparatus located upon the upper end of the cylinders being omitted. Fig. 6 is a plan view, the portion of the engine above the line 6 6, Fig. 1, being cut away and the parts in the plane of the line 6 6 being shown in section. Fig. 7 is a section on the line 7 7, Fig. 1, parts being indicated as they would appear looking from below. Fig. 8 is a detail elevation, partly in section, of the inlet-pipe, passages, and valves. Fig. 9 is a perspective of the valve-guiding ring shown in Fig. 8. Fig. 10 is a sectional elevation of two of the exhaust-valves and the parts immediately adjacent thereto. Fig. 11 is a sectional detail of the inlet-valves and the parts immediately adjacent thereto. Fig. 12 is a perspective view of one of the inlet-valve-operating levers. Fig. 13 is a plan view of the cam which actuates the inlet-valves. Fig. 14 is a section on line 14 14, Fig. 13. Fig. 15 is a section on line 15 15, Fig. 13. Fig. 16 is a section on line 16 16, Fig. 13.

A is the base of the machine.

B is the cylinder and casting.

$A'$ $B'$ $C'$ $D'$ are the four cylinders. $a$ $b$ $c$ $d$ are the pistons therein.

E is the main shaft of the engine. $E'$ $E^2$ are two cranks thereon.

The pistons $a$ $b$ are connected rigidly together at their lower ends, and the pistons $c$ $d$ are similarly connected together. The connecting-rod $E^3$ is pivoted at one end to the crank $E'$ and at the other end to the pistons $a$ $b$. The connecting-rod $E^4$ is connected at one end to the crank $E^2$ and at the other end to the pistons $c$ $d$. The cranks $E'$ $E^2$ are set opposite to or at an angle of one hundred and eighty degrees from each other.

$E^5$ is a gear-wheel upon the shaft E.

$E^6$ is a speed-reducing gear-wheel pivoted upon its own spindle secured to the base. Its teeth mesh with the teeth of the gear-wheel $E^5$. The diameter of the gear-wheel $E^6$ is twice that of $E^5$.

$E^7$ is a double crank secured by one of its wrist-pins near the periphery of the wheel $E^6$, the other wrist-pin being located a short distance from the first in the direction of the circumference of the wheel $E^6$ and extending outward from the free end of the crank $E^7$.

F is a cam-shaft extending across the top of the cylinders and adapted to turn in bearings on said cylinders.

$F'$ is a disk upon the end of the shaft and keyed thereto.

$F^2$ is a double crank, similar to the crank $E^7$, but located upon the outer side of the disk $F'$, toward the periphery of said disk.

$e$ $e'$ are connecting-rods pivoted at their ends, respectively, the rod $e$ to the outer wrist-pins of the double cranks $F^2$ $E^7$ and the rod $e'$ to the inner wrist-pins of said cylinders.

$e^3$ $e^3$ are turnbuckles upon the rods $e$ $e'$, adapted to adjust the lengths of said rods.

It will be seen that by the use of the double cranks $F^2$ $E^7$ connecting rods $e$ $e'$ the disks $F'$ may be actuated thereby with the same angular velocity as the gear-wheel $E^6$ and that there will be no dead-centers. By this device the motion of the wheel $E^6$ is communicated to the shaft F.

G is a rod supported by the cylinder-casting B and adapted to be reciprocated in guides.

$G^2$ is a rack upon the sliding rod G.

$G^3$ is a stationary arm extending above and near to the rack $G^2$.

$G^4$ is a gear-wheel keyed upon a shaft $G'$, which shaft is adapted to turn in a bearing in the outer end of the arm $G^3$. The teeth of the gear-wheel $G^4$ mesh with those of the rack $G^2$.

$G^5$ is a lever-arm upon the shaft $G'$, by which said shaft may be rotated.

$G^6$ is a governor mechanism, which may be of the usual fly-ball description. $G^7$ is a friction-wheel keyed upon the spindle of said governor mechanism, its periphery contacting that of the periphery of the disk $F'$, so that said friction-wheel will be driven by said disk. The governor mechanism $G^6$ engages the outer end of the lever $G^5$, so that as the speed of the engine varies said lever will be actuated, turning the gear-wheel $G^4$ and moving the rod $G$ longitudinally.

$A^2$ $B^2$ $C^2$ $D^2$ are inlet-valves belonging, respectively, to the cylinders indicated by the same letters, with different distinguishing numbers.

$A^3$ $B^3$ $C^3$ $D^3$ are valve-stems belonging to their respective valves, as indicated by the reference-letters.

$A^4$ $C^4$ $B^4$ $D^4$ are levers adapted to contact the upper ends of respective inlet-valve stems to actuate their respective valves.

$A^5$ $B^5$ $C^5$ $D^5$ are cams secured upon the shaft $F$ and adapted to operate their respective inlet-valve levers, as indicated by their reference-letters.

$A^6$ $B^6$ $C^6$ $D^6$ are exhaust-valves in the respective cylinders, as indicated by their reference-letters.

$A^7$ $B^7$ $C^7$ $D^7$ are cams upon the shaft $F$, adapted to operate the respective exhaust-valves, as indicated by the reference-letters.

H is an inlet-pipe for the explosive mixture.

$H^2$ is the air-inlet, and $H^3$ is the inlet for gas. The pipe $H^3$ communicates with a chamber surrounding the pipe $H^2$.

$H'$ is a non-return valve opening inward and adapted to close the pipe $H^2$ by engaging a valve-seat formed upon the walls of the chamber surrounding the air-pipe $H^2$.

$h$ $h$ are apertures formed through the seat of the valve $H'$ and forming communications between the air-port of said valve and the chamber surrounding said air-pipe. When the valve $H'$ engages with its seat, the apertures H are closed, as is also the air-inlet. When the valve $H'$ is drawn from its seat by the suction of the engine, the apertures $h$ $h$ are opened, allowing the gas to flow therethrough, and the air-pipe is also opened, permitting the air to flow by the valve $H'$, and thereby intimately intermixing the gas and air.

$H^4$ is a hollow casting connecting the inlet-pipe H with the cavity $H^5$, formed in the upper part of the casting B, which cavity connects with the inlet-valves $A^2$ $B^2$ $C^2$ $D^2$.

I is an exhaust-pipe communicating with ports of the exhaust-valves.

$h'$ is a ring adapted to fit closely into the lower end of the air-inlet $H^2$ and serve as a guide for the stem of the valve $H'$.

$H^6$ $H^6$ are non-return valves controlled by springs in the usual way and adapted to close the openings between the casting $H^4$ and the cavity $H^5$, so that none of the explosive mixture shall be driven out of said cavity back into the hollow of said casting and pipe H. The valves $H^6$ are not necessary to the running of the engine, at least after it is started.

Turning to Figs. 13, 14, 15, and 16, which illustrate the cam adapted to operate the inlet-valve of the cylinder A and which is of the same description as the cams adapted to operate the inlet-valves of the other cylinders, it will be noticed that the salient part of this cam varies in circumferential width from one end to the other, so that the inlet-valves will be held open a longer or shorter time, according as the levers operate them, contacting the broader or the narrower portions of said cam. When the engine is running at full power, the narrow portions of the cams contact their respective levers and the inlet-valve is allowed to close about on the lower dead-center of the engine or a little after. I prefer to close the inlet-valve when the piston has returned one-fourth of its stroke. When the levers contact the broader portions of the cams, the inlet-valves are held open proportionately longer, so that at the broadest portion of the cams the inlet-valves are held open for about half of the return stroke. When the inlet-valves are held open by their cams after the engine has passed its lower dead-center, a part of the explosive mixture drawn in is again expelled through the inlet-valve. While this action is occurring in one cylinder another cylinder is drawing in its explosive charge and the explosive mixture forced out of the first-mentioned cylinder is passed over to the second and enters with its intake, so that a proportionately less amount of explosive mixture is drawn in through the pipe H. This action occurs successively in all the cylinders, so that the amount of mixture drawn into the engine is diminished in proportion to the length of contact of the inlet-valve levers with their operating-cams.

The method of regulating the point of contact between the levers and their cams will be understood from the following description, reference being had to the other figures, and especially to Figs. 1 and 2. When the engine is running at its normal speed, the balls of the governor mechanism $G^6$ are drawn close to the shaft by their springs, the lever $G^5$ is at its farthest point toward the right, as shown in Fig. 1, and the sliding rod G is at its extreme position toward the right. The inlet-valve-operating levers are pivoted upon the rod G so as to turn relative thereto, but prevented from moving longitudinally thereon. At the one end of said levers is a crosspiece J, which rests upon the upper ends of the valve-stem. The other ends of said levers $a^4$ rest upon the cams. When the speed of the engine increases, the balls of the governer fly out from the shaft, drawing the lever $G^5$ toward the left, as shown in Fig. 1, which moves the rod F and levers $A^4$ $B^4$ $C^4$ D⁴ with it toward the left, which brings said levers in contact with the broader portion of their actuating-cams in proportion to the distance that they are drawn toward the left.

If we designate the different phases of the cycle by numbers, as follows: 1, the explosive stroke; 2, the exhaust-stroke; 3, the charge-stroke, and 4 the compression-stroke, and, further, if we designate the cylinder in which the various phases of the cycle are occurring by the letters $a\ b\ c\ d$, written after the numbers designating the phases, we may represent the action of the engine by the following scheme:

|  |  |  |  |
|---|---|---|---|
| $a1$ | $a2$ | $a3$ | $a4$ |
| $b3$ | $b4$ | $b1$ | $b2$ |
| $c4$ | $c1$ | $c2$ | $c3$ |
| $d2$ | $d3$ | $d4$ | $d1$ | in which the actions designated in each vertical column are occurring at the same time. For instance, referring to the first vertical column and commencing with the explosion-stroke in the cylinder A', the pistons $a\ b$ are descending and the pistons $c\ d$ ascending. The explosion-stroke is occurring in cylinder A', the intake-stroke in cylinder B', the compression-stroke in cylinder C', and the exhaust-stroke in cylinder D'. If the engine is governing, a part of the charge already drawn into the cylinder C' is being pushed out of its inlet-port and is being drawn into the cylinder B'. On the exhaust-stroke in the cylinder A a part of the charge drawn into the cylinder B is being discharged through its inlet-port and drawn into the cylinder D'. Upon the intake-stroke of the cylinder A' a part of the charge in the cylinder D is being discharged and drawn into the cylinder A'. On the compression-stroke in the cylinder A' a part of its charge is being pushed out through its inlet-port and drawn into the cylinder C', as designated in the successive vertical column in the above scheme.

It will be noticed that the above-described engine is governed without missing a stroke, without throttling, and without altering the nature of the mixture, that it works quite as well when governing and in some respects better than when running at full power, because the expansion is more complete, and consequently more power is derived from the same volume of mixture and the exhaust is not as loud.

In proportion to the length of the stroke the compression-space is made quite small, so that a fair degree of compression will be obtained while governing, as above described.

What I claim is—

1. The combination of two gas-engine cylinders, valves and valve-operating mechanism therefor, pistons in said cylinders, means for giving said pistons a relative motion so that a compression-stroke shall occur in one cylinder at the time that an intake-stroke is occurring in the other cylinder and means for putting the two cylinders into communication with each other during a portion of their compression and intake strokes.

2. The combination of two gas-engine cylinders, valves and valve-operating mechanism therefor, pistons in said cylinders, means for giving said pistons a relative motion so that a compression-stroke shall occur in one cylinder at the time that an intake-stroke is occurring in the other cylinder, and an adjustable means for putting the two cylinders into communication with each other during a varying portion of their compression and intake strokes.

3. The combination of two gas-engine cylinders, valves and valve-operating mechanism therefor, pistons in said cylinders, means for giving said pistons a relative motion so that a compression-stroke shall occur in one cylinder at the time that an intake-stroke is occurring in the other cylinder, an adjustable means for putting the two cylinders into communication with each other during a varying portion of their compression and intake strokes, and means for automatically adjusting the portion of said strokes that the said cylinders are in connection by means of the speed of the engine.

4. The combination of two gas-engine cylinders, valves and valve-operating mechanism therefor, pistons in said cylinders, means for giving said pistons an equal velocity so that a compression-stroke shall occur in one cylinder at the time that an intake-stroke is occurring in the other cylinder, and means for putting said cylinders into communication with each other during a portion of their intake and compression strokes.

5. In a gas-engine employing the four-stroke cycle, the combination of four cylinders so arranged that an intake-stroke is coincident in time with a compression-stroke, a passage-way communicating with all of the ports of the inlet-valves, each of said valves being adapted to remain open for a portion of the compression-stroke and a portion of the intake-stroke and an inlet communicating with said passage-way.

6. In a gas-engine employing the four-stroke cycle, the combination of four cylinders so arranged that an intake-stroke is coincident in time with a compression-stroke, a passage-way communicating with all of the ports of the inlet-valves, each of said valves being adapted to remain open a portion of the compression-stroke, and a corresponding portion of the intake-stroke and an inlet communicating with said passage-way.

7. In a gas-engine employing the four-stroke cycle, the combination of four cylinders, so arranged that an intake-stroke is coincident in time with a compression-stroke, a passage-way communicating with all of the ports of the inlet-valves, an inlet communicating with said passage-way and an adjustable means for causing each of said valves to remain open during a portion of the compression-stroke, and a corresponding portion of the intake-stroke.

8. In a gas-engine employing the four-stroke cycle, the combination of four cylinders so arranged that an intake-stroke is coincident in time with a compression-stroke, pistons in said cylinders joined together in pairs, a shaft having cranks set one hundred and eighty degrees from each other, one pair of said pistons being coupled to one of said cranks and the other pair coupled to the other of said cranks, a passage-way communicating with the ports of all the inlet-valves, and an inlet communicating with said passage-way.

In testimony whereof I sign this specification in the presence of two witnesses.

WILLIAM E. NAGEBORN.

Witnesses:
   MAY E. KOTT,
   ELLIOTT J. STODDARD.